INVENTOR.
Howard H. Haworth

Oct. 15, 1957  H. H. HAWORTH  2,809,791
CONTINUOUS DEAD REEL LET-OFF WITH CONTROLLED TENSION
Filed Jan. 10, 1955  8 Sheets-Sheet 2

INVENTOR.
Howard H. Haworth
BY
Soans, Glaister & Anderson
Attys.

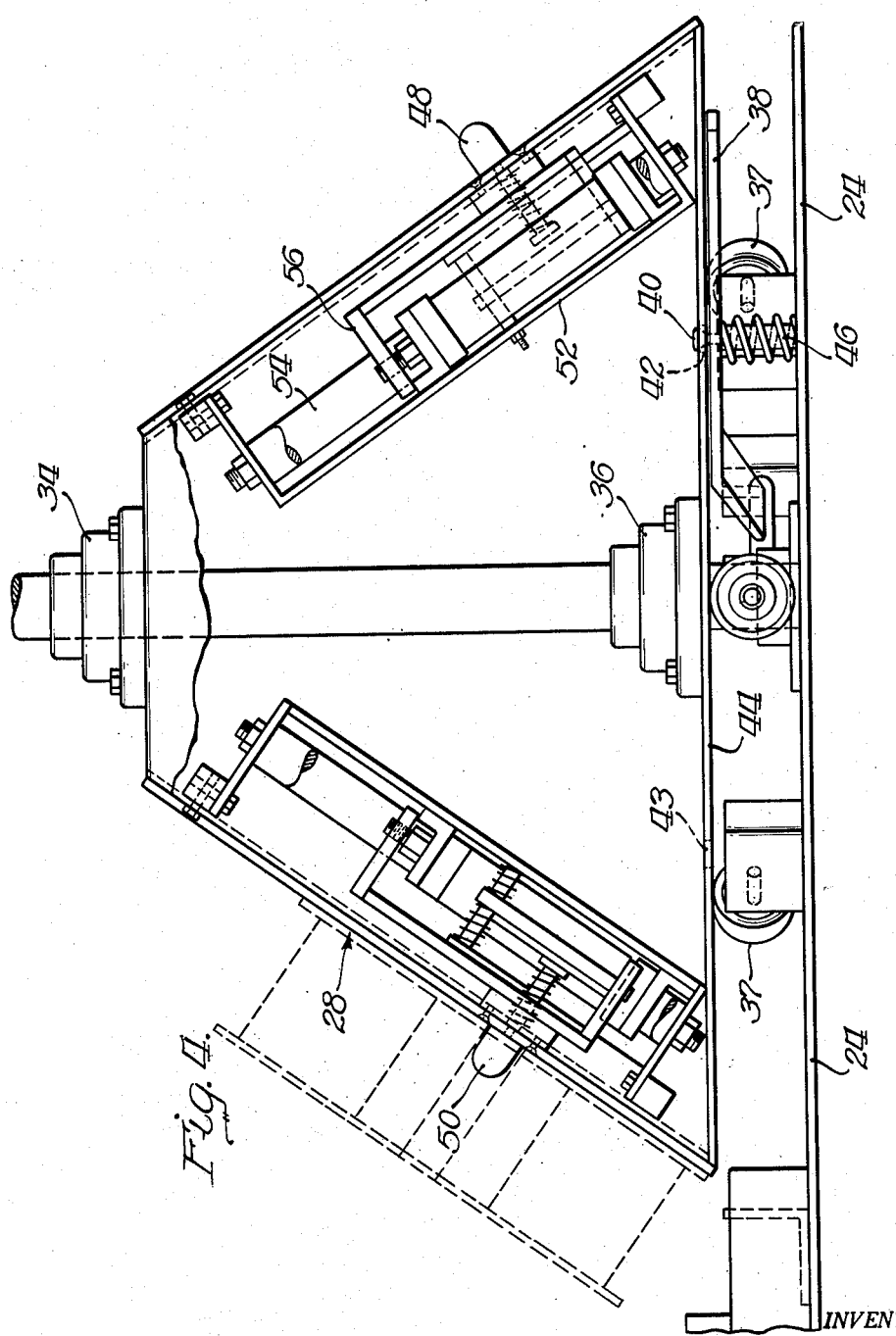

Oct. 15, 1957     H. H. HAWORTH     2,809,791
CONTINUOUS DEAD REEL LET-OFF WITH CONTROLLED TENSION
Filed Jan. 10, 1955     8 Sheets-Sheet 4
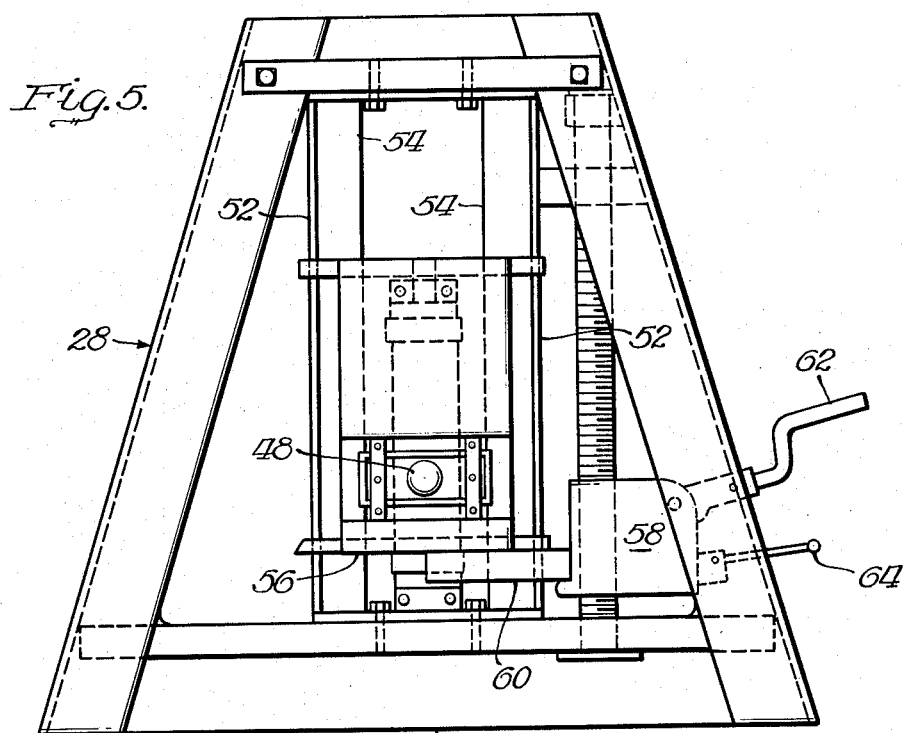
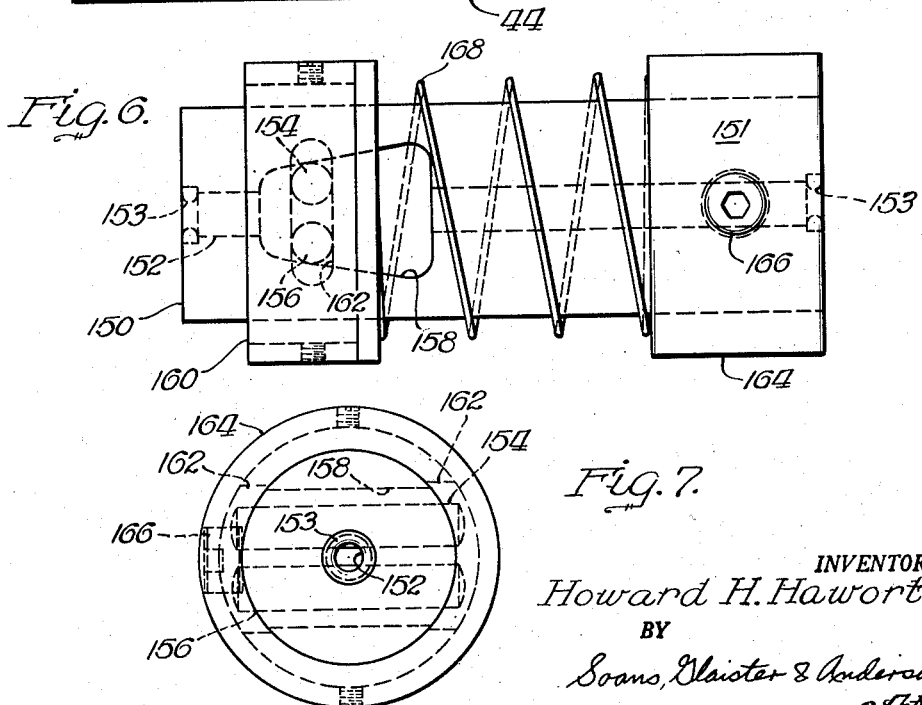
INVENTOR.
Howard H. Haworth
BY
Soans, Glaister & Anderson
Attys.

Oct. 15, 1957 H. H. HAWORTH 2,809,791
CONTINUOUS DEAD REEL LET-OFF WITH CONTROLLED TENSION
Filed Jan. 10, 1955 8 Sheets-Sheet 5
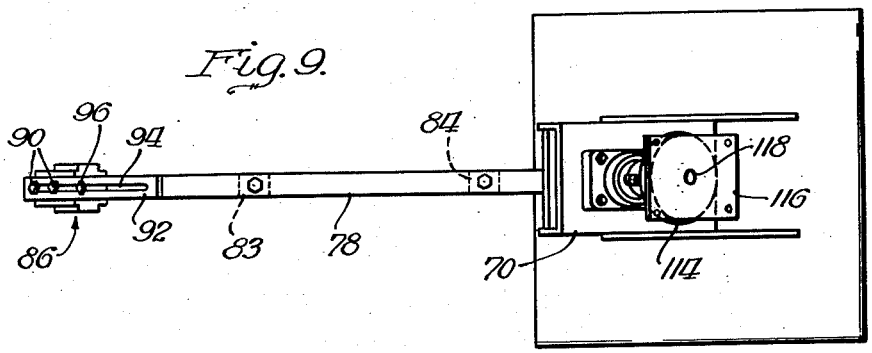
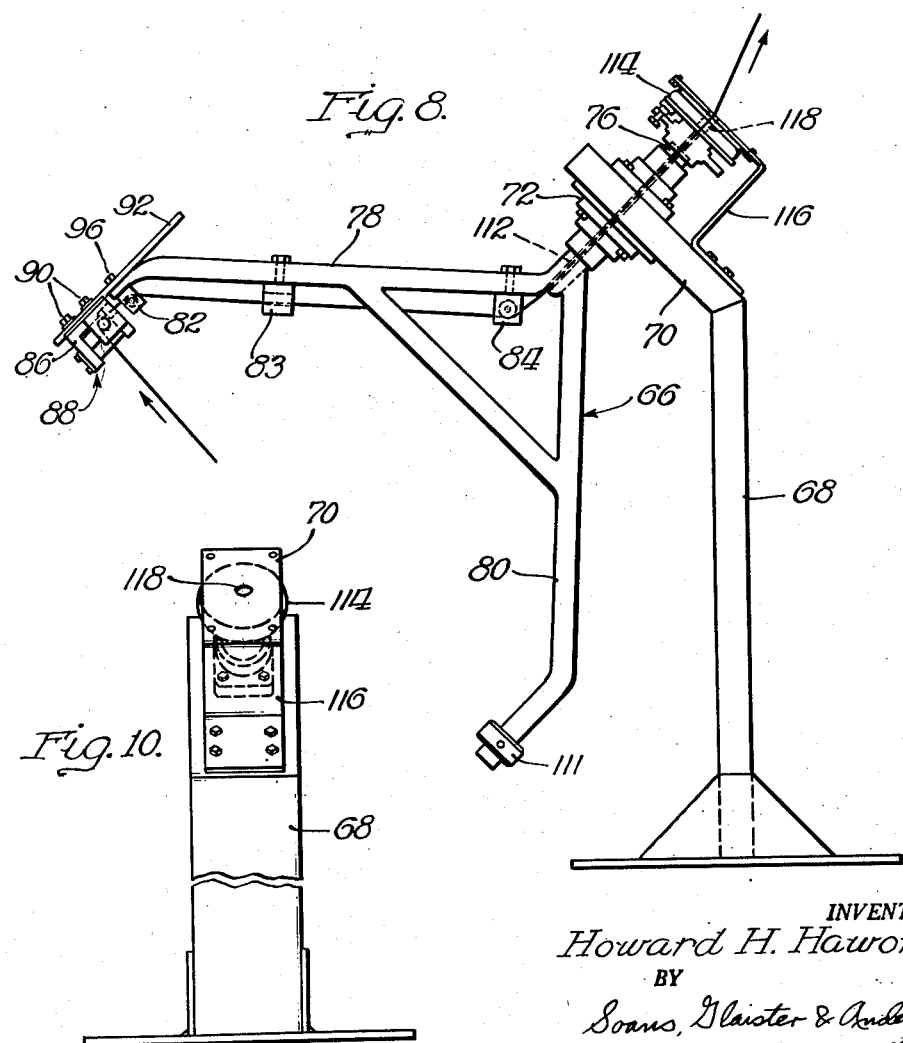
INVENTOR.
Howard H. Haworth
BY
Soans, Glaister & Anderson
Attys.

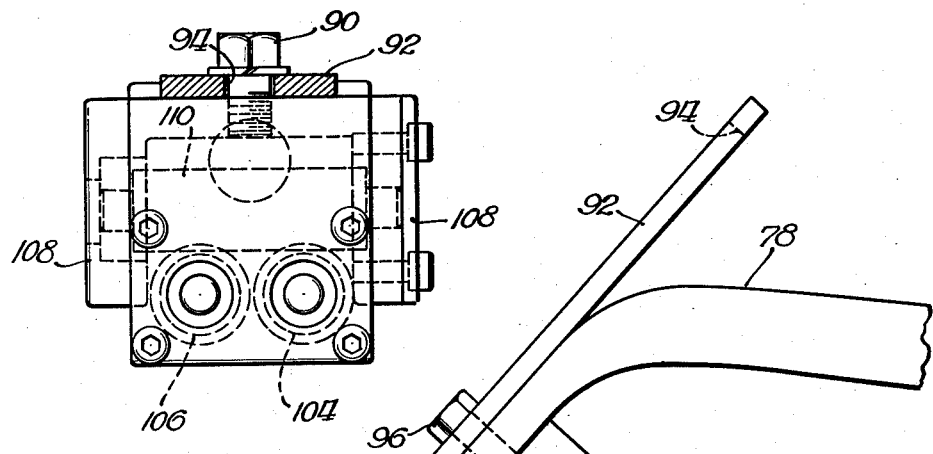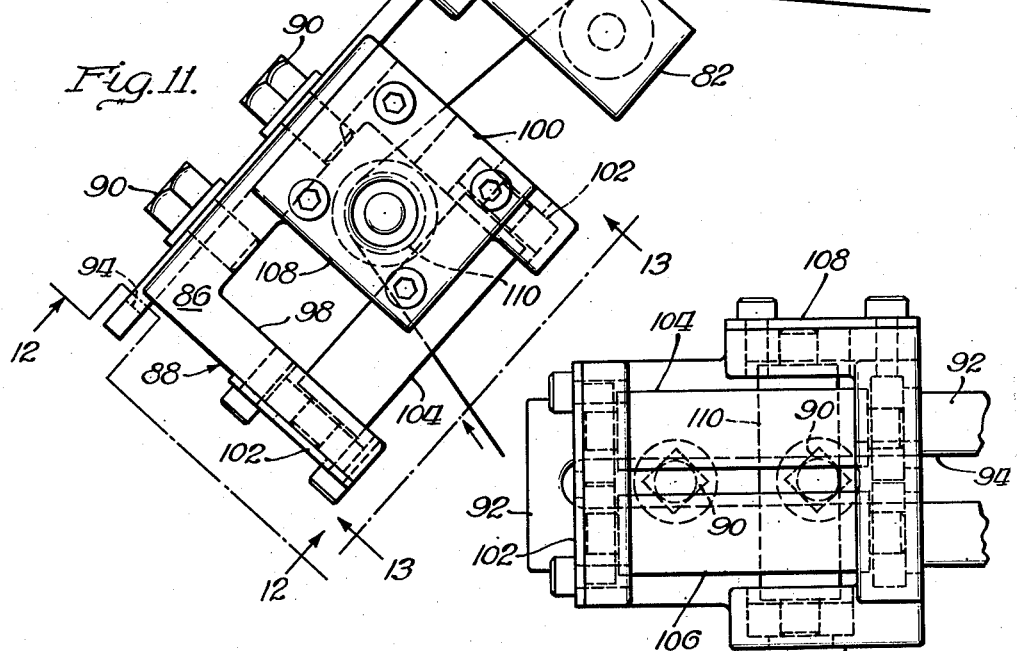

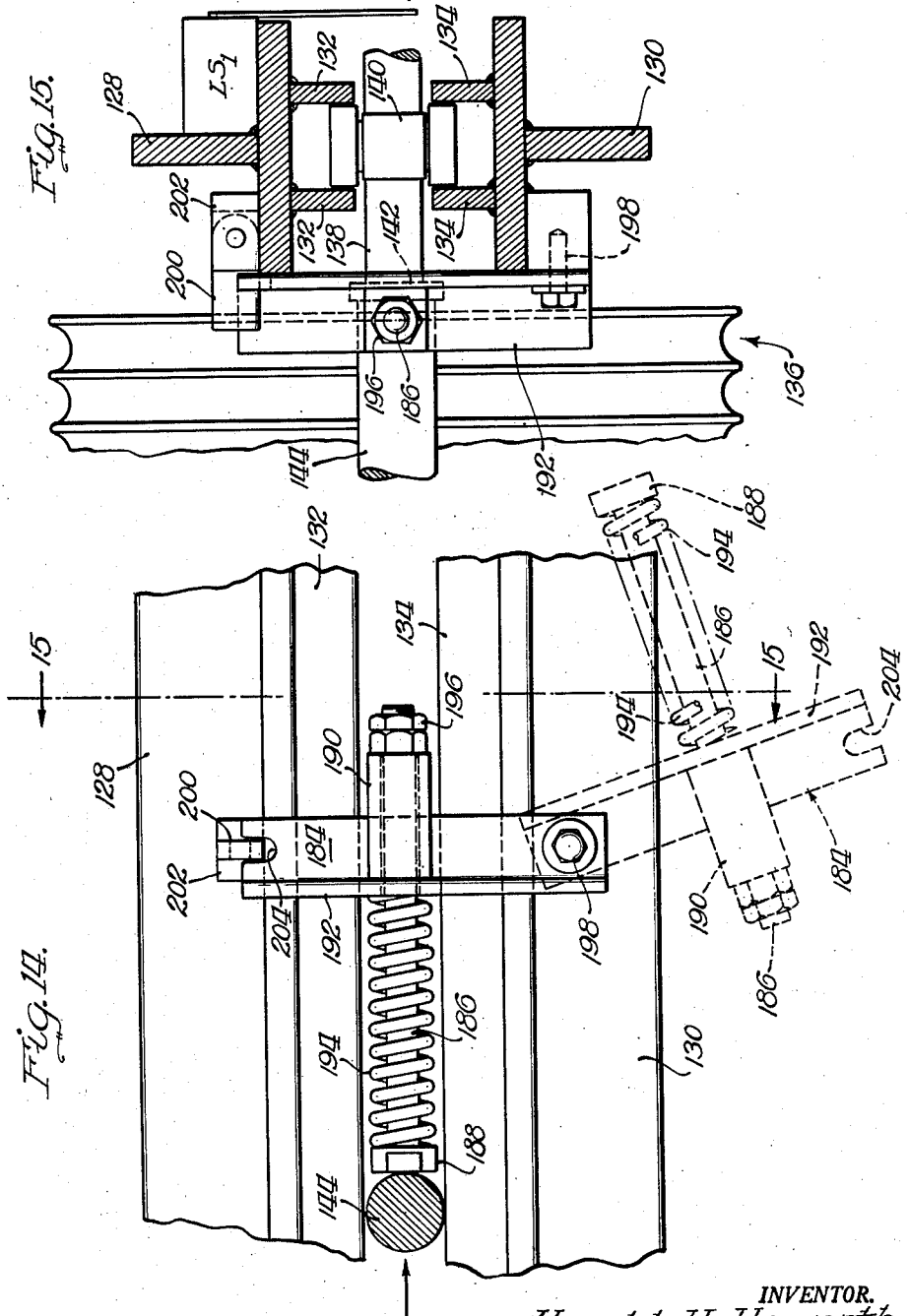

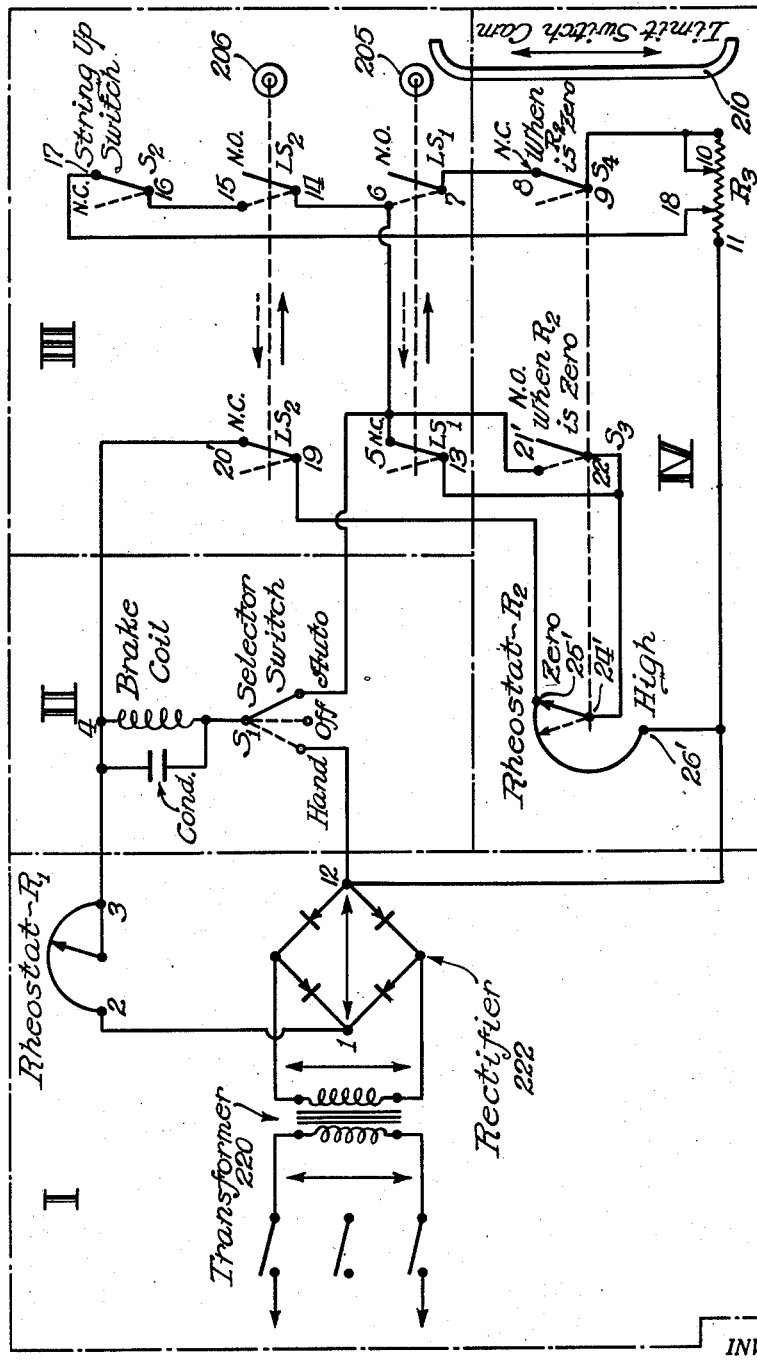

United States Patent Office 2,809,791
Patented Oct. 15, 1957

2,809,791

CONTINUOUS DEAD REEL LET-OFF WITH CONTROLLED TENSION

Howard H. Haworth, Fountain City, Ind., assignor to Belden Manufacturing Company, Chicago, Ill., a corporation of Illinois Application January 10, 1955, Serial No. 480,775

6 Claims. (Cl. 242—128)

The present invention relates generally to wire let-off mechanisms, and is more particularly directed to apparatus which is operable to unreel wire for delivery to a wire processing machine and to maintain a continuous supply of such wire at a constant controlled tension.

In many different types of wire processing machines it is desirable, if not essential, that wire be fed into the machine at a substantially constant tension. For example, in the manufacture of insulated conductors the bare wire is advanced continuously from a supply reel, as by means of a take-up capstan which draws the wire through an insulation applying means such as an extruder. Since the extruder feeds the plastic insulation material at a substantially constant rate of speed, variations in the tension of the conductor as it is withdrawn from the supply reel causes a change in the speed of the wire and may result in variations in the thickness of the covering formed by the extruder.

Moreover, there exists different problems in supplying wires of different sizes to the processing machine. With relatively small diameter wire there is very little resistance to the bending of the wire and, also, practically no momentum created by the travel of the wire from the supply reel. Consequently, a variation in the tension on the wire frequently causes kinking of the wire as the wire lags and then is picked up again by the action of the take-up capstan. Then too, the strength characteristics of such wire make it essential that a very low tension be maintained on the conductor. With the larger diameter wire the unit weight is, of course, a factor in adding impetus to the travel of the wire, which must be considered in maintaining a uniform tension on the wire being delivered to the processing machine.

Many different devices have been designed to overcome the above difficulties by attempting to control the tension of the wire as it is drawn from the supply or let-off reel. However, such devices have generally been rather unsatisfactory and usually limited to a quite narrow range of wire sizes because of the difference in the problem of control mentioned above. Moreover, the prior devices are relatively complicated and expensive units which are generally connected, mechanically or electrically, with the associated processing machine.

It is the primary object of the present invention to provide a relatively simplified form of dead reel supply or let-off reel mechanism, which affords a constant controlled tension for the wire being fed to an associated processing machine, independently of the rate of feed of the wire, without the need for any mechanical or electrical connection with the processing machine. Other objects of the invention are to provide a dead reel let-off mechanism having tension control means for the wire being supplied from the reel, which follows the variations in speed of the processing equipment with which it is used; to provide mechanism for unreeling wire which is portable and which does not require any connection with the associated processing machine and, therefore, may be used interchangeably with various wire processing machines; and to provide a constant tension dead reel let-off mechanism which affords a feeding of wire to the processing machine in a continuous sequence from a plurality of reels without halting the processing machine.

Other objects and advantages of the present invention will become apparent from the following description of one form of the invention, which is illustrated in the accompanying drawings, wherein:

Figure 4 is an enlarged fragmentary view of the structure in Figure 1, with parts broken away and in section to more clearly show certain of the parts of the mechanism;

Figure 5 is an end elevational view of the structure in Figure 4;

Figure 6 is an enlarged plan view of the pinch roll seen particularly in Figure 1;

Figure 7 is an end elevational view of the structure in Figure 6;

Figure 8 is an enlarged side elevational view of a portion of the structure seen particularly in Figure 1;

Figure 9 is a top plan view of the structure shown in Figure 8;

Figure 10 is an end elevational view taken from the right side in Figure 8, with parts broken away;

Figure 11 is an enlarged fragmentary view of the structure in Figure 8;

Figure 12 is a view taken along the line 12—12 in Figure 11;

Figure 13 is a view of the structure in Figure 11, taken along the line 13—13;

Figure 14 is an enlarged fragmentary view of the structure shown in Figure 1, with an alternate position of certain elements shown in broken lines;

Figure 15 is a sectional view taken along the line 15—15 in Figure 14; and

Figure 16 is a diagrammatic showing of the electrical control portion of the illustrated mechanism.

The illustrated example of a constant tension let-off mechanism constructed in accordance with the present invention includes a turntable support for a pair of supply reels, a rotatable wire guide termed a "flyer" for picking the wire off whichever reel is in delivering position, and a wire tensioning device or stand comprising a fixed sheave and a relatively movable or "dancer" sheave. The wire supply reels are disposed on the turntable at an angle with respect to the horizontal, and the flyer is movable around one of the reels through a path generally normal to the reel axis to pick the wire from the reel. From the flyer the wire is directed around the fixed sheave and the dancer sheave to form one or more adjustable loops before passing to the wire processing machine.

The flyer includes a suitably journalled supporting shaft which is provided with an electro-magnetic brake to control the speed of rotation of the flyer. In operation, if the linear speed of the wire being drawn into the processing machine differs from the peripheral speed of the winding diameter of the let-off reel, the adjustable loops of wire will shorten or lengthen to thereby actuate control mechanism which will increase or decrease the speed of the flyer by changing the amount of braking effect on the flyer shaft. By thus controlling the speed of the flyer there is achieved a uniform tension on the wire being passed to the processing machine, the amount of this uniform tension being determined by the particular arrangement of the tension stand mounting the adjustable loops formed around the sheaves, as will be more fully explained in a subsequent portion of the description.

Figure 1:
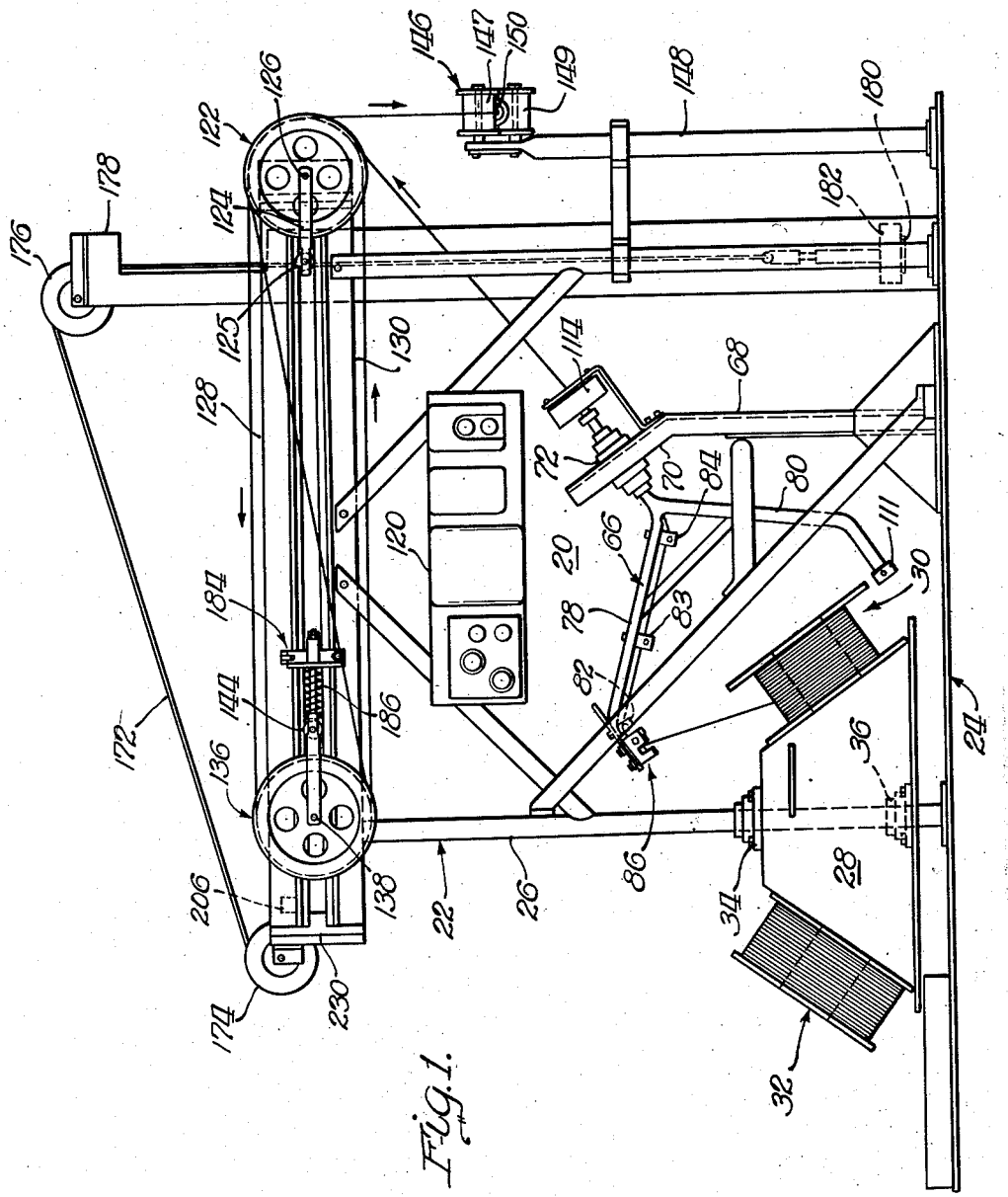
Figure 1 is a side elevational view of a let-off mechanism constructed in accordance with the invention and adapted to supply wire to a processing machine.

With reference to Figure 1 of the drawings, it is seen that the wire let-off mechanism, indicated generally at 20, includes an upright frame structure or stand 22 which is supported on a rectangular base or platform 24. One end of the frame 22 includes a vertically extending post 26 which provides a support for a rotatable reel table 28 upon which are mounted a pair of wire reels 30 and 32.

As seen particularly in Figures 4 and 5, the reel table 28 is in the shape of a truncated pyramid, preferably of metal construction, and includes a pair of vertically spaced-apart bearing structures 34 and 36 which rotatably support the reel table on the frame post 26 in axially fixed relation thereto. Additional support is provided for the reel table 28 by two or more rollers 37 which are mounted on the platform 24 in circumferentially spaced apart positions for rolling engagement by the bottom plate portion 44 of the reel table.

The rotation of the reel table 28 is controlled by means of a foot pedal 38 (Figure 4), which includes a vertically extending stop pin 40 for engaging a selected one of a pair of openings 42 and 43 in the bottom plate 44 of the table 28. A coil spring 46 is disposed between the platform 24 and the pedal 38 to bias the latter upwardly to a position affording engagement between the stop pin 40 and one of the openings 42 and 43. Consequently, when it is desired to rotate the reel table, the foot pedal 38 is depressed sufficiently to disengage the stop pin 40 from the table and the latter is rotated until the second opening is positioned for engagement by the stop pin.

Disposed along the inclined outer surface of the reel table 28 and at opposite ends thereof are a pair of wire reel supporting posts 48 and 50, which are preferably adjustably positionable so as to accommodate reels of various diameters in centered relation to the flyer 66. Each of these posts is mounted on a structure which is disposed inwardly of the reel supporting surface of the table 28. As shown in Figures 4 and 5, this post supporting structure generally comprises a pair of angle bracket members 52 which support a pair of elongated cylindrical guides 54 in parallel spaced relation to the outer wall of the reel table. The guides 54 in turn support a sliding frame structure 56 to which is secured the reel supporting post.

A screw jack 58 is disposed along one side of the cylindrical guides 54 to provide means for effecting movement of the slidable frame 56, and the reel post attached thereto, relative to the cylindrical members 54. The jack includes an elevating arm 60 in position for engagement with the bottom of the frame 56 and an operating crank 62. A suitable latch 64 is also provided in order to lock the screw jack in a selected position.

Referring to Figure 1, adjacent the mid-portion of the main frame 22 of the let-off mechanism there is disposed a rotatable, generally Y-shaped flyer structure 66, for unreeling the wire from the adjacent reel 30 on the turntable 28. More particularly, the flyer 66 includes an upright support 68 which is mounted on the base 24 and has its upper end portion 70 bent toward the reel table 28. This upper end 70 includes a bearing structure 72 having its axis disposed generally at right angles with respect to the adjacent inclined surface of the reel table. The flyer 66 includes a cylindrical shaft portion 76 which is rotatably mounted in the bearing 72 with the diverging arms 78 and 80 of the Y-shaped flyer extending in the direction of the reel table 28 and terminating at diametrically opposed positions adjacent the circumference of the adjacent supply reel 30.

As seen particularly in Figures 8 and 9, the flyer arm 78 includes a series of guides 82, 83 and 84 spaced therealong, and the outer end of the arm includes a wire guide or take-off head 86 for directing the course of the wire as it is taken from the reel and passed through the guides along the arm 78. The take-off head 86 (Figures 11–13) comprises a bracket 88 which is detachably mounted, as by the cap screws 90, on a strap member 92 extending outwardly from the outer end portion of the flyer arm 78. The strap 92 is preferably adjustably positionable along the end of the flyer arm 78 in order to thereby afford a centering of the take-off head 86 with respect to wire supply reels of various widths. In this respect a slotted opening 94 is provided along the strap 92 for adjustably securing the latter to the flyer arm, as by a cap screw 96.

The bracket portion 88 of the take-off head 86 is generally U-shaped with the free end portions of its parallel arms 98 and 100 extending in the direction of the wire reel 30 (Figure 1). The lower portion of the bracket arms 98 and 100 (Figures 11–13) includes suitable aligned bearing structures 102 for rotatably mounting a pair of parallel rollers 104 and 106, which are spaced apart sufficiently to permit the passage of wire from the reel 30 therebetween. An upper portion of the bracket 86 includes a pair of additional bearing means 108 which support a third roller 110 in closely overlying, transverse relation to the pair of rollers 104 and 106.

Since the take-off head 86 is a structure of appreciable weight, it is preferable that a compensating weight 111 (Figure 1) be fixed to the end of the other flyer arm 80 in order to provide for a dynamic balance of the flyer.

The flyer shaft 76, which is rotatably mounted in the bearing structure 72 (Figure 8), includes an axial bore 112 therethrough for receiving the wire extending from the reel as it leaves the roller guide 84 at the inner end of the flyer arm 78. At the free end of the shaft 76 there is a conventional type of electro-magnetic brake 114, which is mounted on a bracket 116 fixed to the upright end portion 70 and which is operably connected with the end of the shaft 76 to selectively control the speed of rotation thereof. The brake 114 includes an axial opening 118 therethrough which provides an extension of the flyer shaft bore 112 for passage of the wire from the flyer.

The electric brake 114 is controlled by a rheostat, in a manner to be described later, so that the braking effect on the flyer shaft 76 varies with the requirement for more or less speed of the flyer to maintain a constant tension on the wire being supplied to the processing machine. The main part of the control circuit for the brake 114 is disposed in a housing 120 (Figure 1) which is supported by the main frame 22 in adjacent overlying relation to the flyer.

The upper portion of the frame 22 supports the wire tensioning device for forming a plurality of loops in the wire being unreeled, in a manner affording adjustment of the length of the loops to thereby maintain a constant tension on the wire being supplied to the processing machine. The illustrated tensioning device includes a fixed sheave unit 122, comprising a plurality of separately rotatable pulleys 137, which is rotatably mounted on the delivery end of the let-off mechanism on a cross shaft 126. The cross shaft 126 has its inner end secured to a pair of elongated T-members 128 and 130, which form the upper part of the main frame 22 and which are disposed with their flanges facing each other in vertically spaced relation. The sheave unit 122 also includes a pair of arms 124 extending to a guide roller 125 which is also fixed at one end to the frame members 128 and 130.

The facing flange surfaces of the T-members 128 and 130 each have fixed thereto a pair of vertically extending guide rails 132 and 134, respectively, which provide means for slidably supporting the movable sheave unit or dancer 136. The dancer sheave unit includes a plurality of separately rotatable pulleys 139 and is rotatably mounted on a cross shaft 138 which extends between the T-members 128 and 130 (Figure 15). The dancer 136 is slidably secured to the latter T-members by a carrier member 140 which is fixed on the shaft 138 in position between the guide rails 132 and 134. The sheave unit 136 also includes a pair of side arms 142 which extend toward the fixed sheave unit 122 and have a transverse roller 144 mounted at their free ends.

Figure 2:
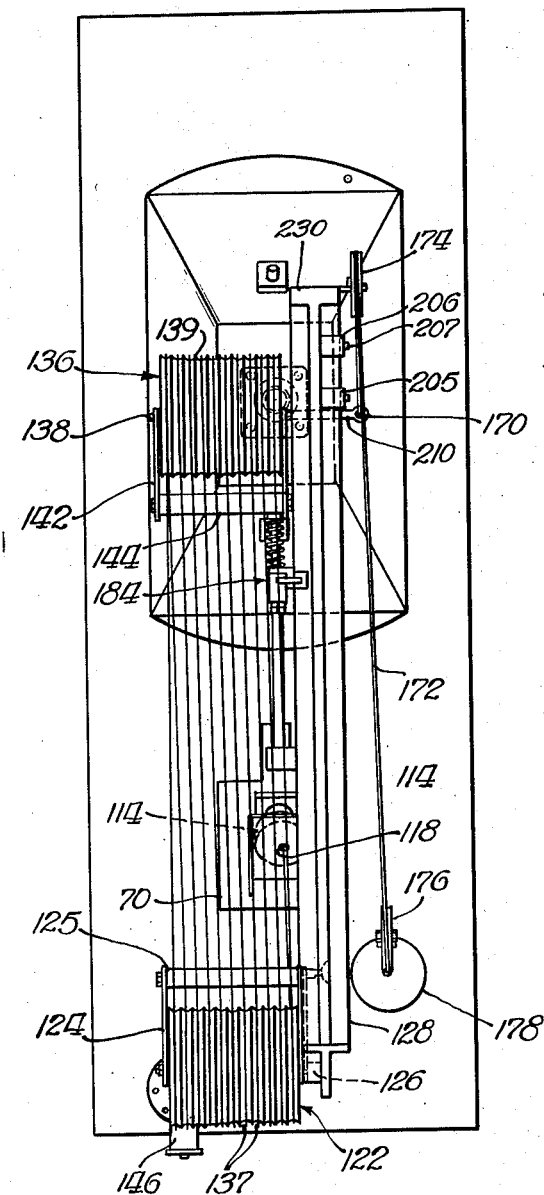
Figure 2 is a plan view of the let-off mechanism shown in Figure 1.

Looking again at Figures 1 and 2, it will be seen that the wire being taken from the supply reel 30 passes through the take-off head 86, where it lies between the rollers 104 and 106 (Figure 11) and over the roller 110, and through the guides 82, 83 and 84 disposed along the inside of the flyer arm 78. The wire then goes through the center bore 112 (Figure 8) of the flyer shaft and out the opening 118 in the electric brake housing to the string-up where it is looped a number of times between the fixed sheave unit 122 and the dancer sheave 136. In the illustrated embodiment the fixed sheave unit 122 includes eleven separate sheaves or pulleys and the dancer 136 has ten sheaves, the variation in number being provided so that the wire may enter and leave the tension stand at the same end of the let-off mechanism. It will also be noted in Figure 2 that the conductor passes from the flyer outlet 118 to the innermost sheave of the fixed sheave assembly 122, then to the innermost sheave of the floating sheave assembly 136. The conductor is then strung back and forth between these sheave assemblies progressing toward the outermost sheaves. On the last pass the conductor goes from the bottom side of the outermost sheave of the assembly 136 to the top side of the outermost sheave of the fixed assembly 122, and partially around the latter sheave to carry the conductor downward to a pinch roll assembly 146.

Figure 3:
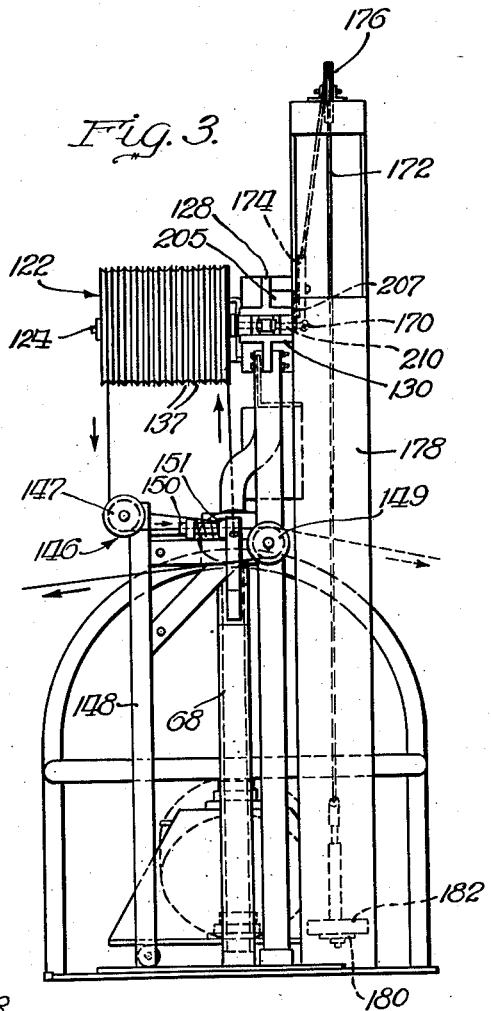
Figure 3 is an end elevational view, taken from the right side in Figure 1, of the mechanism illustrated in Figures 1 and 2.

From the wire string-up in the tension stand just described, the wire passes to a pinch roll unit 146 (Figure 1) and then to the processing machine (not shown). The pinch roll is designed to permit movement of the wire in only one direction, i. e. away from the let-off mechanism 20, so as to prevent loss of the string-up in the event of a break in the wire leading to the processing machine. The pinch roll unit or assembly 146 is supported on a post 148 at the delivery end of the let-off mechanism and, as seen best in Figures 6 and 7, includes a pair of guide rollers 147 and 149 which are disposed at opposite ends of a pinch roll 151 (Fig. 3). The roller 147 guides the conductor from the fixed sheave assembly 122 into the center bore 152 of the pinch roll 151, and the roller 149 affords a guide for the conductor as it passes from the pinch roll to the processing machine. The pinch roll 151 comprises an elongated cylindrical member 150 having a longitudinal bore 152 therethrough. A suitable filler ring 153 is preferably placed at opposite ends of the bore 152 to reduce the wear on the wire traveling through the pinch roll.

The pinch roll 151 affords means for preventing a reverse movement of the wire which comprises a pair of small rollers 154 and 156 disposed through a transverse opening 158 in the cylindrical member 150 at a position adjacent one end of the latter and intersecting the longitudinal bore 152. A collar 160 is disposed around the cylinder 150 and includes a pair of opposed slotted portions 162 which receive the opposite ends of the rollers 154 and 156. The transverse opening 158 is provided with inclined upper and lower surfaces so that sliding movement thereby provided for the collar 160 along the cylinder 150 effects relative movement of the rollers 154 and 156 in the slots 162.

A second collar 164 is fixed to the opposite end of the pinch roll, as by a set screw 166, and a coil spring 168 is interposed between the collar 164 and the collar 160. The spring 168 is chosen so as to exert a small amount of pressure on the slidable collar 160 to thereby urge the small pinch rollers toward each other. During normal operation the tension on the wire passing between the rollers 154 and 156 is sufficient to keep the rollers apart and permit the passage of the wire. However, when this tension ceases, as by a break in the wire after it leaves pinch roll unit 146, the spring 168 is sufficiently strong to move the collar 160 to the left in Figure 6 and pinch the wire between the rollers 154 and 156 to halt any further movement of the wire relative to the pinch roll.

A predetermined tension is placed on the wire in the wire tensioning unit provided by the sheave units 122 and 136, by means including a counterbalancing weight acting on the dancer unit 136. As noted in Figure 2, the cross shaft 138 for the dancer unit extends outwardly beyond the T-members 128 and 130 to present an eye portion 170 which affords means for attaching one end of a rope 172 or the like. The rope extends around a sheave 174 at the supply reel end of the let-off mechanism and then forwardly to a second sheave 176 rotatably mounted at the upper end of a vertically extending tube 178, which is mounted on the platform 24 adjacent the delivery end of the let-off. The rope 172 extends into the tube 178 and has secured thereto a small circular platform 180 for receiving one or more weights 182.

It is seen, therefore, that the weight 182 exerts a force on the dancer unit 136, which in turn is translated into a predeterminable tension on the wire in the string-up. In the illustrated embodiment there is provided ten loops in the string-up comprising twenty strands of wire and, consequently, the tension on the wire is $\frac{1}{20}$ of the amount of pull exerted on the dancer 136 by the weight 182.

Intermediate the fixed sheave unit 122 and the dancer unit 136 there is provided a spring stop 184 (Figure 1) for yieldingly resisting the movement of the dancer toward the fixed sheave unit. As seen best in Figures 14 and 15, the stop 184 comprises a bumper rod 186 which includes an enlarged end portion 188 disposed in the path of the transverse roller 144 carried by the dancer sheave 136. The other end of the rod 186 is slidably mounted in a sleeve 190 which is fixed to an angle member 192 mounted on the T-members 128 and 130 along the top of the let-off frame structure. A coil spring 194 is disposed along the bumper rod 186, between the rod end 188 and a projecting flange of the angle member 192, to bias the rod in the direction of the dancer 136. Displacement of the rod 186 relative to its supporting sleeve 190 is prevented by a pair of nuts 196 positioned on a threaded end portion of the rod in abutting relation to one end of the sleeve 190.

In order that the spring stop 184 may be moved clear of the dancer sheave 136, as during reel changes when it is desirable to make available the stored wire in the wire tensioning unit, the angle member 192 is pivotally mounted on the frame member 130, by a cap screw 198, and releasably held in its operating position by a latch 200. The latch 200 is pivotally supported on a bracket 202 fixed to the upper frame member 132 and is engageable with a notch 204 formed in the upper end of the angle member 192 supporting the spring stop. Thus the entire spring stop 184 can be rotated about the pivot screw 198, as indicated in broken lines in Figure 14, to clear the path of the dancer 136.

Also mounted on the upper portion of the main frame 22, along the end of the T-member 128 overlying the supply reel turntable 28, are a pair of limit switches 205 and 206 (Figure 2) which are electrically connected with the control circuit in housing 120 for the flyer brake 114. Each of these limit switches includes a trip arm 207 extending downwardly into the path of a limit switch cam comprising the shank portion 210 of the eye 170 at the outer end of the center shaft 138 of the dancer sheave unit 136, with the trip arm for the switch 205 being positioned for engagement in advance of the trip arm for the switch 206, as the dancer 136 moves outwardly to increase the length of the wire loops in the string-up mechanism. The effect of the actuation of these limit switches will be explained in connection with the description of the operation of the let-off mechanism.

In the operation of the let-off mechanism 20 a pair of wire reels 30 and 32 are mounted on the turntable 28, with the latter being indexed by the foot-controlled latch pin 40 (Figure 4) into a position presenting the reel 30 within the path of the rotatable flyer 66 (Figure 1). The wire from the reel 30 is strung between the rollers 104 and 106 (Figure 11) and then over the roller 110 of the take-off head 86 to the guide 82 at the outer end of the flyer arm 78. From the latter guide the wire continues along the arm 78 through the guides 83 and 84 (Figures 1 and 8) to the center bore 112 of the flyer shaft 76 and out the axial opening 118 in the brake 114.

As noted particularly in Figures 1–3, the wire from the flyer passes first to the fixed sheave unit 122 and is then looped back and forth around the dancer sheave unit 136 and the fixed sheave unit to present a series of generally parallel loops. The last strand in this string-up in the wire tensioning unit, which is disposed around the outermost pulley of the dancer 136 passes around the outermost pulley on the fixed sheave unit 122 and then extends to the pinch roll unit 146. The wire enters the left end of the axial bore 152 in the pinch roll, as seen in Figure 6, and passes between the pinch rollers 154 and 156 and then out to the processing machine (not shown), where it is wound around a power driven capstan or the like (also not shown), to thus complete the wire string-up in readiness for operation.

It should be noted that before starting the processing machine to draw wire from the let-off mechanism 20, the reel 30 should be centered with respect to the flyer arms. This is readily accomplished by means of the screw jack (Figure 5) which is operable to elevate and lower the reel supporting post 48 along the side of the turntable 28. Moreover, the take off head 86 on the flyer arm 78 (Figure 11) should be approximately centered with respect to the width of the reel, as by shifting the position of the strap member 92 along arm 78, so that the wire from the reel may enter the take-off head at generally right angles to the rollers 104 and 106 on the latter.

In the string-up provided by the sheave units 122 and 136 a predetermined amount of tension is placed on the wire loops by the counterweight 182 (Figure 1) which is acting to pull the dancer pulley 136 toward its outermost position. As noted previously the weight 182 has a sliding fit with the tube 178 in order that any sudden drop of the weight might be cushioned by the air in the tube below the weight. If desired, the lower portion of tube 178 containing the weight 182 may be filled with oil to provide a more positive cushion for the sliding weight.

Although the withdrawal of wire through the let-off 20 may be initiated with the electric brake 114 off and the shaft 78 free to rotate, in most instances it will be desirable to introduce a small amount of current to the brake coil to produce a light drag on the flyer shaft 78. The manner of achieving this will be seen best in Figure 16 wherein a diagram of the electrical control circuits for the brake 114 are presented. Generally, the circuit I comprises a power source including a transformer 220 and a rectifier 222 for conversion to direct current which are disposed within the housing 120.

A rheostat $R_1$ (circuit I) is placed in one of the D. C. leads from the rectifier in order to provide for adjustment of the voltage output of the rectifier. Preferably this adjustment is made in the initial set-up, and the rheostat is mounted in the transformer-rectifier housing so that it is not available for operator adjustment. Of course, it is desirable that the voltage output of the rectifier be adjusted for smooth operation of the brake 114 and to avoid a too severe braking effect.

The brake coil (circuit II) is connected in series with a selector switch $S_1$ which can be set by the operator to "Hand," "Off," or "Automatic." In the "Hand" position full voltage, as determined by the above initial setting of rheostat $R_1$, is applied to the brake coil and locks the flyer 66 (Figure 1) in position. In the "Off" position, all voltage is removed from the brake coil and leaves the flyer 66 free to turn. Generally, this position will only be used when threading the conductor through the flyer guides, so that the operator can easily position the flyer as required. The normal run position of the selector switch $S_1$ is in the "Automatic" position, wherein the voltage in the brake coil is controlled by the automatic portions in circuit III.

With the selector switch $S_1$ set in the "Automatic" position and with the conductor strung up through the flyer 66 (Figure 1), the tension control sheave assemblies 136 and 122, and through the pinch roll 146 on into the extruder or other processing machine, the operation is as follows: As the conductor starts to move into the extruder, the loops between sheave assemblies 136 and 122 will be shortened and the limit switch cam 210 (Figures 2 and 3) will alternately move on and off of limit switch 205. As indicated in Fig. 16, each of the limit switches 205 and 206 comprise a pair of switches arranged in a gang, with the pair of switches operated by the limit switch 205 being designed as $LS_1$, and the pair of switches operated by the limit switch 206 being indicated by $LS_2$. When the limit switch cam is off of switch 205 ($LS_1$), no current can flow through the brake coil and the flyer 66 is free to turn. When the cam 210 on the dancer 136 engages switch 205 ($LS_1$), current is caused to flow through the brake coil so as to provide braking effort on the flyer and slow its motion but not to stop it.

In the latter instance wherein $LS_1$ is actuated, the flow of current is from point 1 through to point 12 in sequence, with $LS_1$ being closed between points 6 and 7 and open between points 5 and 13. Current flow is determined by the amount of resistance at $R_3$ which is adjusted at the initial set-up and is generally not changed thereafter. During normal low speed operation the limit switch cam 210 will ride gently on and off the limit switch 205 ($LS_1$). During normal high speed operation the sheave assembly 136 will ride against the spring tension assembly 184 (Figure 1) and remain in this steady position.

If the extruder is stopped abruptly, the limit switch cam 210 (Figure 2) will immediately move back against limit switch 205 ($LS_1$). However, since the current flow in this position is not enough to stop the flyer on a quick stop, the dancer 136 will continue to move toward the left in Fig. 1 and, if not stopped, all conductor tension will be lost as the dancer moves against the end stop. To prevent this from happening a second limit switch 206 ($LS_2$) (Figures 2 and 16) is provided. Consequently, before the dancer 136 can reach the end stop it engages switch 206 and additional voltage is applied to the brake coil to stop the flyer. Under these conditions the current flow (Figure 16) is between points 1 thorugh 6, 14 through 18, 11 and 12. $LS_2$ between points 14 and 15 is now closed and open between points 19 and 20. $LS_1$ is closed between points 6 and 7 and open between points 13 and 5. Current flow is now controlled by the amount of resistance between points 18 and 11 of rheostat $R_3$, which is properly adjusted during the initial set-up and then left unchanged.

During the string-up of the conductor (Figures 1 and 2) the sheave assembly 136 is at the stop 230 at the left hand end of the machine. This places the limit switch cam 210 on the limit switch 206 ($LS_2$) (Figures 2 and 16) and provides enough current to lock the flyer. Consequently, the operator cannot pull conductor from the supply reel, and in order to overcome this he sets the string-up switch $S_2$ (circuit III) to the string-up or open position which opens the circuit through $LS_2$. A suitable control button for switch $S_2$ is exposed on the control housing 120 (Figure 1) for this purpose.

The current flow during the string-up is now through $LS_1$ only (Figure 16) and, since $LS_1$ is set for a light braking effort, the flyer will turn and feed wire to the operator. As soon as the string-up is completed, the string-up switch $S_2$ is again closed and the machine is ready for automatic operation.

The control circuit IV is provided so that the operator may have immediate and smooth control of the flyer 66 during a reel change. As the conductor on the reel gets down to the last few turns, the operator will turn the rheostat R₂ off of the zero position a slight amount, for example, about 10 degrees. For this purpose rheostat R₂ has its control mounted externally of the control housing 120.

In the circuit IV, switch S₃ and S₄ is mounted on the same shaft as rheostat R₂. Consequently, when the rheostat R₂ is turned away from the zero position this takes the control of the flyer brake away from the automatic circuit and places it entirely with the operator by means of R₂. Since during a reel change the limit switch cam 210 may be on switch 205 (LS₁), it is necessary to open the circuit between points 8 and 9 and close the circuit between points 21 and 22, which is effected with the aforementioned turning of R₂. Under these conditions current flow is through points 1 through 5, 21', 22', 24', 25', 26' and 12. LS₁ between points 5 and 13 is now open; hence the need for closing S₃ between points 21' and 22' which parallels LS₁. Current flow through the brake coil is now determined by the position of the control arm of rheostat R₂ which is under the operator's control.

As the last wrap of conductor comes off the supply reel 30 the operator turns R₂ to point 26', which applies full voltage to the brake coil and stops the flyer. The operator now swings his full supply reel 32 into position, returns R₂ to the zero position and the control circuit is back in automatic operation.

To provide for a continuous supply of wire from the let-off mechanism, the inner end of the wire on reel 30 (Figure 1) is brought out in advance of the emptying of the reel and suitably fixed, as by welding, to the end of the wire on reel 32. As the reel 30 empties, the processing machine is slowed and the flyer 66 is stopped in the above described manner by transfer to manual operation. The spring stop 184 is flipped out of the way of the dancer 136, as indicated in Figure 14, to thereby make available the stored wire in the string-up, and the arms of the flyer are positioned to clear the reel 30 and permit rotation of the turntable 28. The latter is rotated to place the reel 32 in the path of the flyer arms, with the reel being automatically indexed in proper position through the foot pedal 38 (Figure 4) and the stop pin 40. The control is then switched back to "automatic" and full speed operation is resumed.

In some cases, such as with low speed heavy conductor jobs, it may be desirable to apply more conductor tension than can be obtained by means of the automatic tensioning system control as described above. This is easily done and is accomplished by turning rheostat R₂ (Figure 16) away from the zero position and towards point 26' until the desired conductor tension is obtained. This control is manual and can produce heavy tensions if desirable. Under such manual operation it is of course necessary that the spring bumper 184 be in position such that it will hold the sheave assembly 136 in the position shown in Fig. 1. Also, under these conditions of manual tension control the selector switch S₁ remains in the automatic position.

It is seen, therefore, that there is disclosed herein a dead reel let-off mechanism which provides for a continuous supply of wire and automatic control of the wire being supplied in a manner affording uniform control of the wire tension irrespective of variations in the speed of the feed of the wire. The described system provides a particularly delicate balancing of the tension on the wire which makes it extremely advantageous in handling small size wire. For example, an apparatus embodying the principles of this invention has successfully handled #26 A. W. G. wire. Moreover, the invention is equally adaptable to handling larger diameter wires and has been very satisfactory in handling #12 A. W. G. stranded wire and portable cord up to ¼ inch in diameter.

The control provided for the described apparatus is satisfactory for all types of operation including full speed operation under automatic control, retarded operation during reel changes, and under conditions wherein manual control of the flyer is desired. It is also to be noted that the turntable provided for the supply reels offers decided advantages in the angular disposition of the reels, in the automatic indexing feature which assures a proper position for the reels, and in the adjustable center post for the reels which provides for axial alignment between the flyer and the reel from which wire is being withdrawn. The disposition of the supply reel intermediate the horizontal and vertical position prevents wire from sliding down the reel during the let-off operation and avoids any kinking of the wire which might otherwise result from such movement.

The utilization of the spring stop 184 in the string-up is advantageous in that it eliminates the need for heavy weights in the counter-balancing system for the dancer sheave unit 136 and reduces the over-all inertia of the system. The movement of the dancer is thereby controlled more closely to provide a more uniform tension on the wire in the let-off mechanism.

Although shown and described with respect to particular apparatus, it will be apparent to those skilled in the art that various of the features of the present invention may readily be embodied in other types of apparatus without departing from the principles of the present invention.

I claim:

1. A dead reel let-off mechanism affording a continuous supply of wire to a processing machine, said mechanism comprising loop forming means including a floating sheave unit biased for movement in a loop-extending direction to produce a predetermined tension on the wire being drawn from said loop-forming means, a turntable adjacent said loop-forming means, means on said turntable supporting a plurality of wire supply reels in circumferentially spaced relation with each of said reels being similarly inclined with respect to the horizontal, a wire take-off and guide means disposed for rotation about an inclined axis and including a pair of spaced apart end portions which are movable through a path circumferentially of one of said wire reels to withdraw wire therefrom, said turntable providing for positioning of any selected one of said wire reels within the path of rotation of said wire take-off and guide means, adjusting means for said reel support whereby the latter may be centered with respect to said spaced apart end portions of said wire take-off and guide means to thereby place the axis of said one reel in generally parallel relation to said inclined axis of said wire take-off and guide means, and means for controlling the rotation of said wire take-off and guide means which is responsive to the position-changing movement of said floating sheave.

2. A dead reel let-off mechanism affording a continuous supply of wire to a processing machine, said mechanism comprising loop forming means including a floating sheave unit biased for movement to produce a predetermined tension on the wire being drawn from said loop-forming means, a turntable adjacent said loop-forming means, means on said turntable supporting a plurality of wire supply reels in circumferentially spaced relation with each of said reels being similarly inclined with respect to the horizontal, a wire take-off and guide means disposed for rotation about an inclined axis through a path circumferentially of one of said wire reels to withdraw wire therefrom, said turntable including means providing for selective positioning of one of said wire reels within the path of rotation of said wire take-off and guide means, and means for controlling the rotation of said wire take-off and guide means, said latter means including a manual control and an automatic control which is responsive to the position changing movement of said floating sheave, whereby the tension on the wire being withdrawn is automatically controlled through movement of said floating sheave during the let-off operation, and whereby said wire take-off and guide means can be stopped when the supply reel is empty and said turntable revolved to present another full reel within the path of said wire take-off and guide means to resume automatic control of the latter and thereby provide a continuous supply of wire.

3. A dead reel let-off mechanism for wire comprising loop-forming means including a floating sheave and fixed sheave, resilient stop means disposed between said fixed sheave and said floating sheave in position for engagement by said floating sheave, whereby movement of said floating sheave beyond a predetermined point in the direction of said fixed sheave is yieldingly resisted by said stop means, additional means for urging said floating sheave in a direction away from said resilient stop means, a stationary reel arranged to supply wire to said loop-forming means, a rotatable guide means for directing wire from said reel to said loop-forming means, said guide means including an end portion which is movable through a path adjacent the circumference of said wire reel to withdraw wire therefrom, braking means for controlling the speed of rotation of said guide means, and control means for said braking means which is responsive to movement of said floating sheave relative to said resilient stop means to vary the effect of said braking means on the speed of rotation of said guide means.

4. A dead reel let-off mechanism for wire comprising loop-forming means including a frame structure supporting a floating sheave and a fixed sheave thereon in spaced relation to each other, resilient stop means mounted on said frame structure between said fixed sheave and said floating sheave for movement relative to a position within the path of said floating sheave, whereby movement of said floating sheave in the direction of said fixed sheave and beyond a predetermined point in its path of movement is yieldingly resisted when said resilient stop means is in said position, and whereby movement of said resilient stop means away from said position provides for further movement of said floating sheave toward said fixed sheave to thereby afford additional slack in the wire held in said loop-forming means, additional means for constantly urging said floating sheave in a direction away from said resilient stop means, a stationary reel arranged to supply wire to said loop-forming means, a rotatable guide means for directing wire from said reel to said loop-forming means, said guide means including an end portion which is movable through a path adjacent the circumference of said wire reel to withdraw wire therefrom, braking means for controlling the speed of rotation of said guide means, and control means for said braking means which is responsive to movement of said floating sheave in a direction away from said resilient stop means and said fixed sheave to increase the braking effort of said braking means, and which is effective to decrease the braking effort of said braking means as said floating sheave moves toward said fixed sheave to a position of engagement with said resilient stop means.

5. In a dead reel let-off mechanism, loop-forming means including a floating sheave and a fixed sheave, resilient stop means disposed in the path of said floating sheave so as to yieldingly resist movement of said floating sheave towards said fixed sheave, a stationary reel arranged to supply wire to said loop-forming means, a rotatable guide means for directing wire from said reel to said loop-forming means, an electrically operated brake for controlling the speed of rotation of said guide means, and an electrical control circuit for said brake including a switch disposed in spaced-apart relation to said resilient stop means in position for operation by said floating sheave as the latter moves relative to said resilient stop means, said switch being operable to increase the effect of said brake on said guide means to thereby afford means for increasing the normal biasing effect on the wire in said loop-forming means.

6. A dead reel let-off mechanism for wire comprising loop-forming means including a floating sheave and a fixed sheave, means for biasing said floating sheave in a direction away from said fixed sheave, resilient stop means disposed in the path of said floating sheave so as to yieldingly resist movement of said floating sheave towards said fixed sheave, a stationary reel arranged to supply wire to said loop-forming means, a rotatable guide means for directing wire from said reel to said loop-forming means, an electrically operated brake for controlling the speed of rotation of said guide means, and an electrical control circuit for said brake including a plurality of switches disposed in spaced-apart relation in position for sequential operation by said floating sheave as the latter moves relative to said resilient stop means, whereby said control means is effective to progressively increase the effect of said brake on said rotatable guide means in response to movement of said floating sheave away from said resilient stop means and to progressively decrease the effect of said brake in response to movement of said floating sheave toward said resilient stop means.

References Cited in the file of this patent

UNITED STATES PATENTS

| | | |
|---|---|---|
| 789,904 | Foss | May 16, 1905 |
| 1,798,980 | Kayser | Mar. 31, 1931 |
| 1,873,422 | Keller | Aug. 23, 1932 |
| 2,157,847 | Chapman | May 9, 1939 |
| 2,202,204 | Hogue | May 28, 1940 |